Nov. 22, 1966    C. F. HAUTAU    3,286,324
MACHINE TOOL
Filed Dec. 21, 1964    7 Sheets-Sheet 6
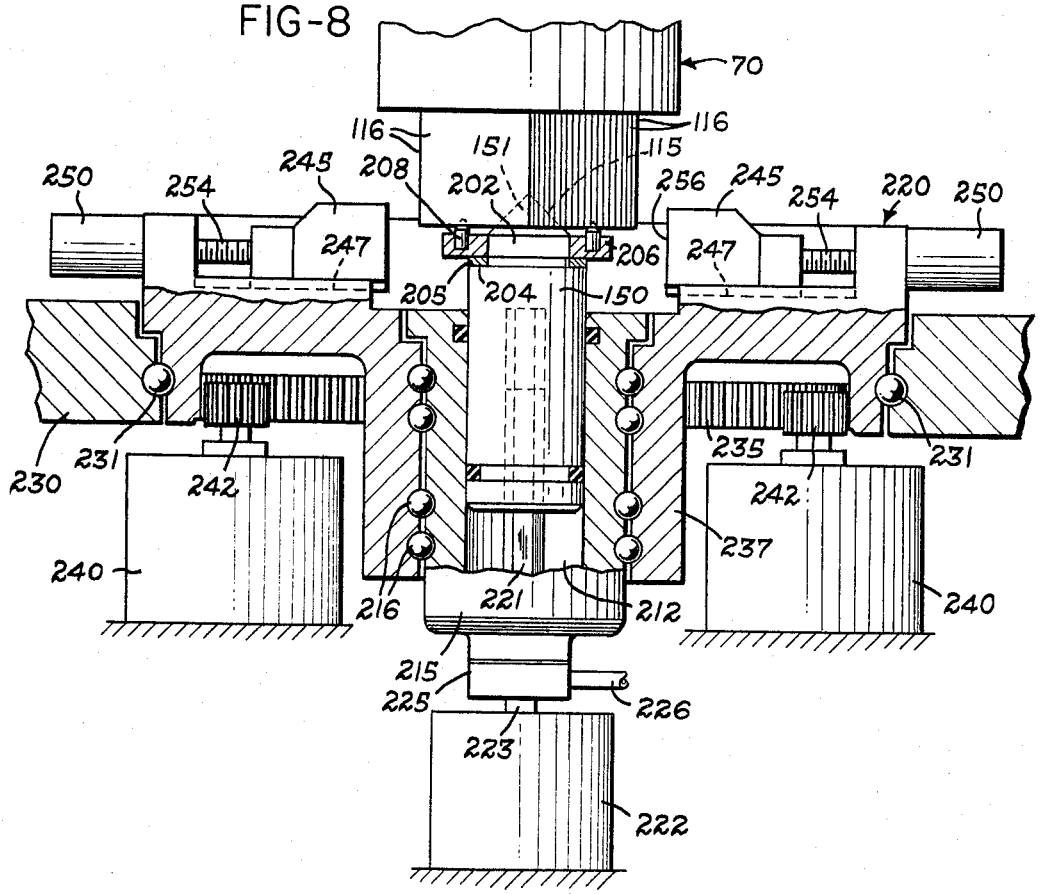
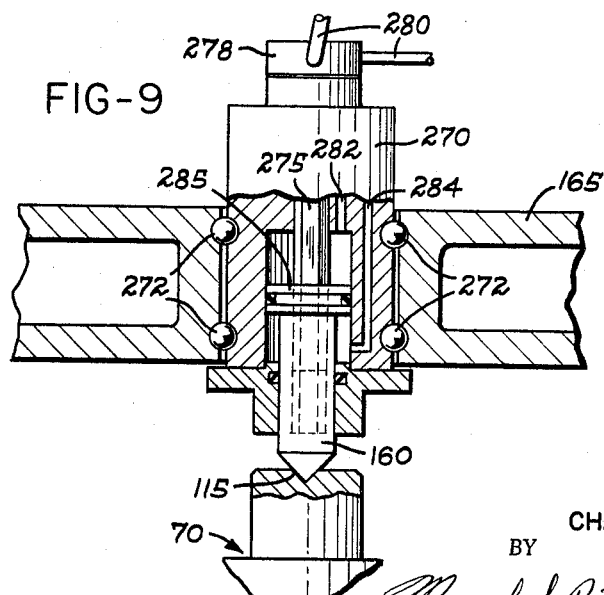
INVENTOR.
CHARLES F. HAUTAU
BY
Marechal, Biebel, French & Bugg
ATTORNEYS Nov. 22, 1966    C. F. HAUTAU    3,286,324
MACHINE TOOL
Filed Dec. 21, 1964    7 Sheets-Sheet 7
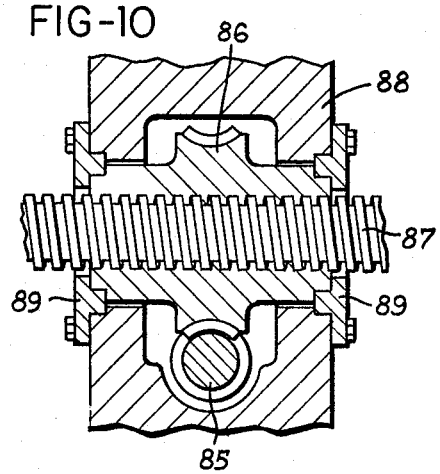
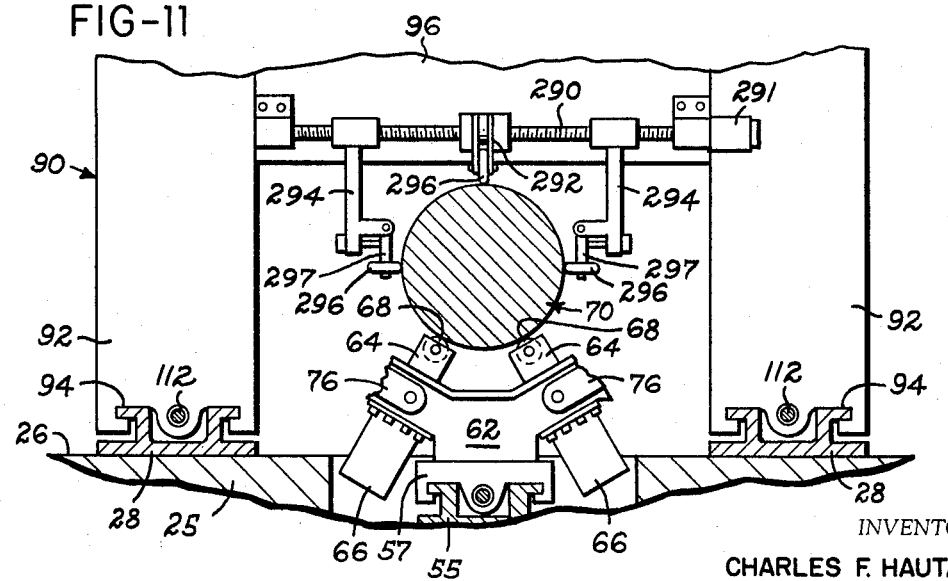
INVENTOR.
CHARLES F. HAUTAU
BY
Marechal, Biebel, French & Bugg
ATTORNEYS

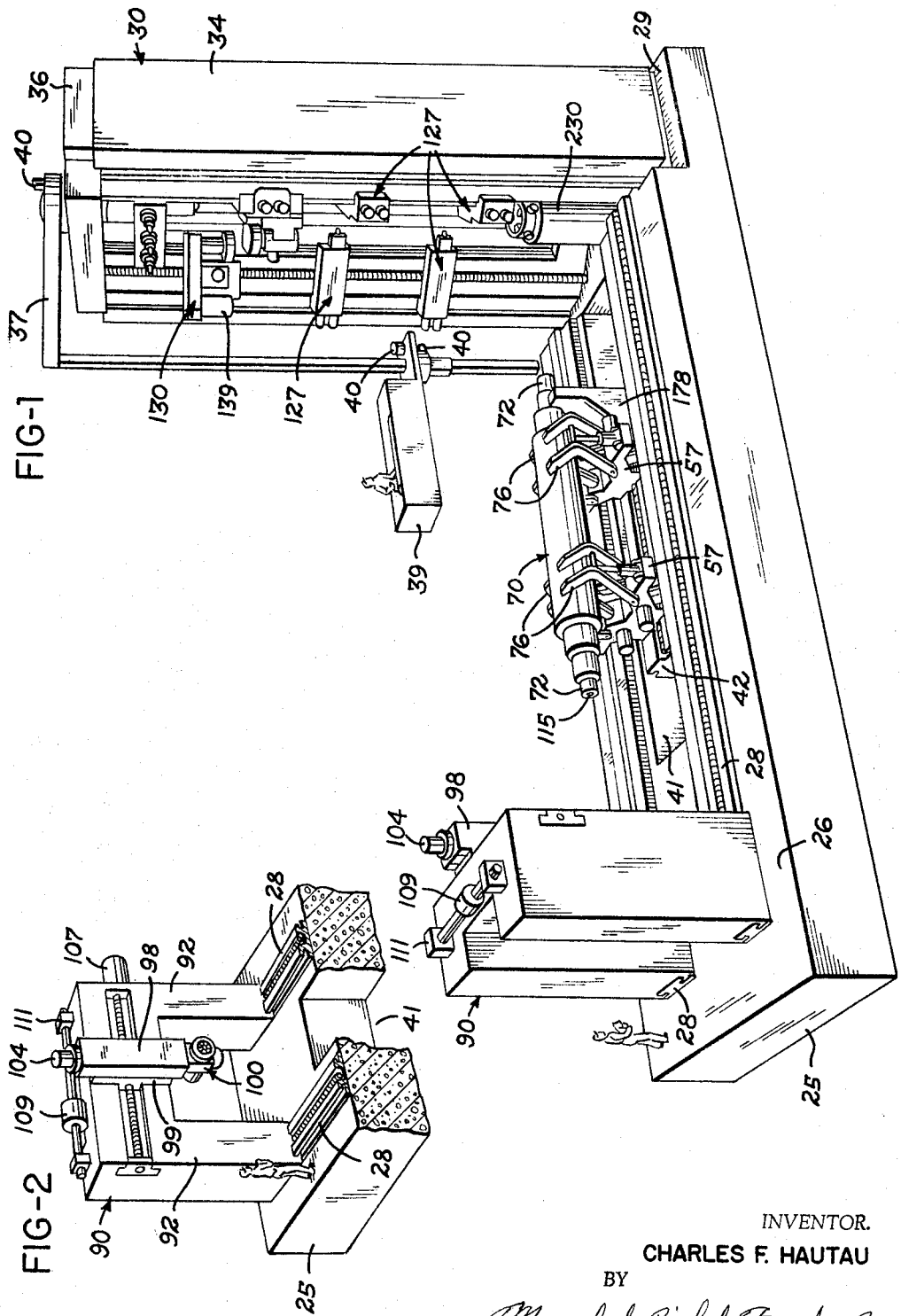

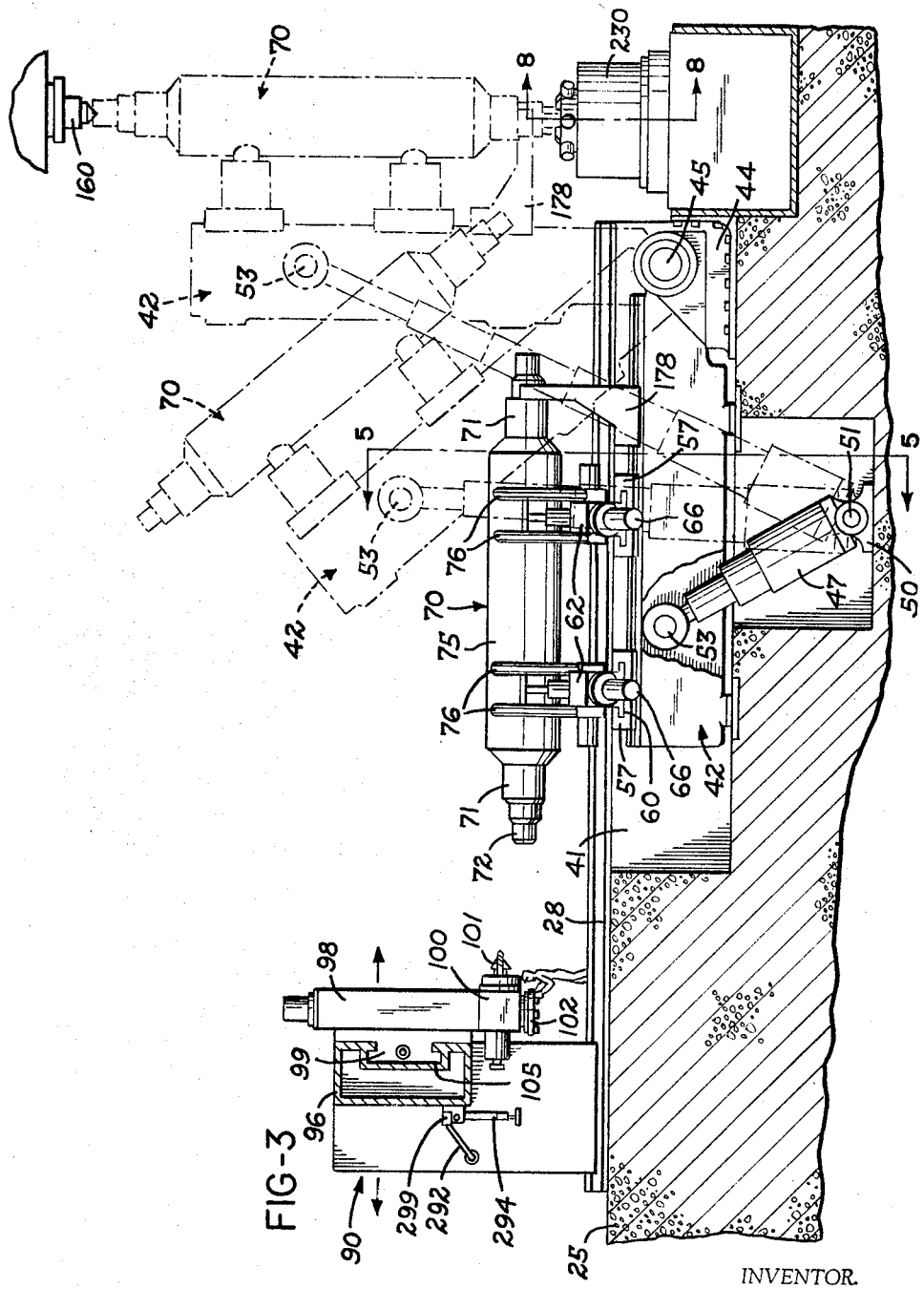

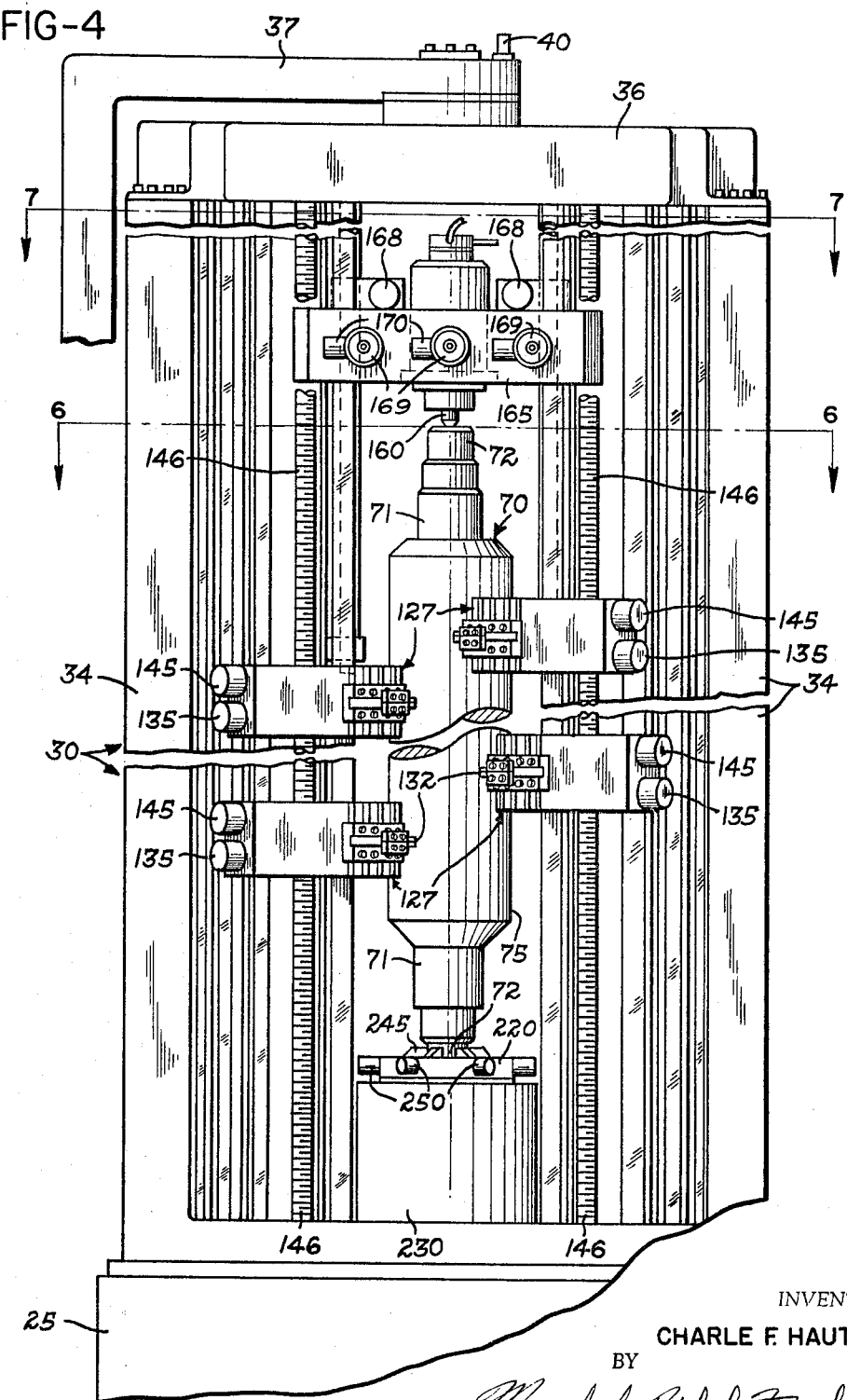

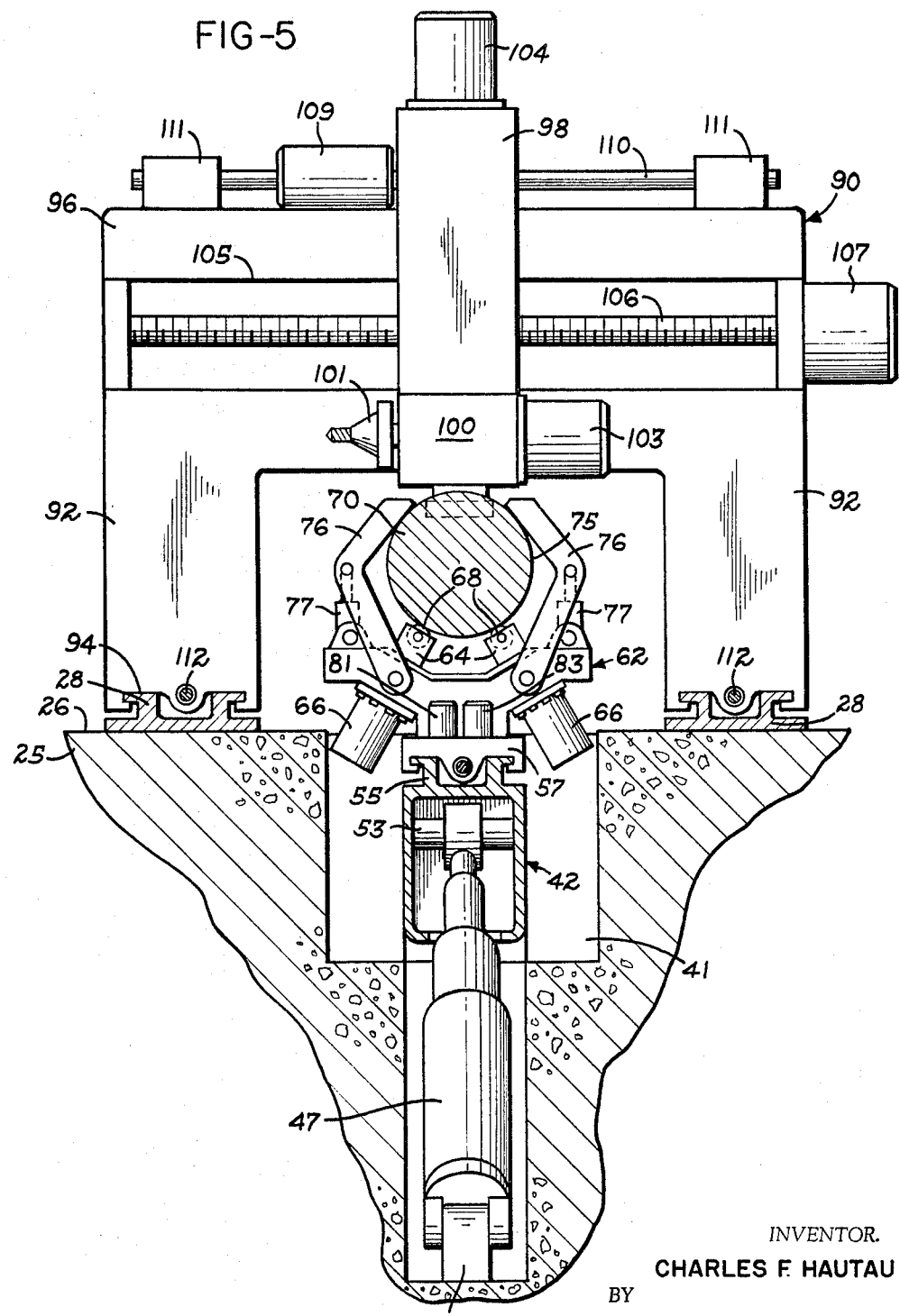

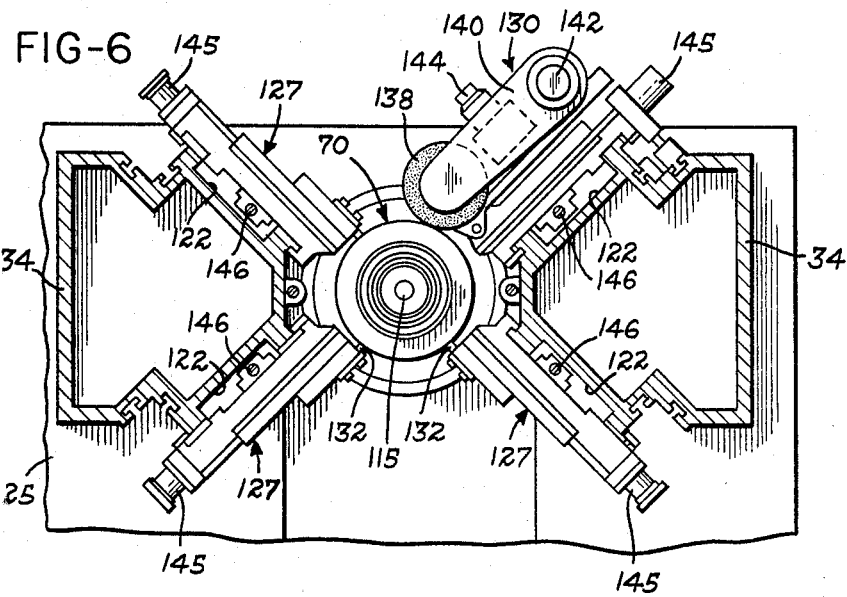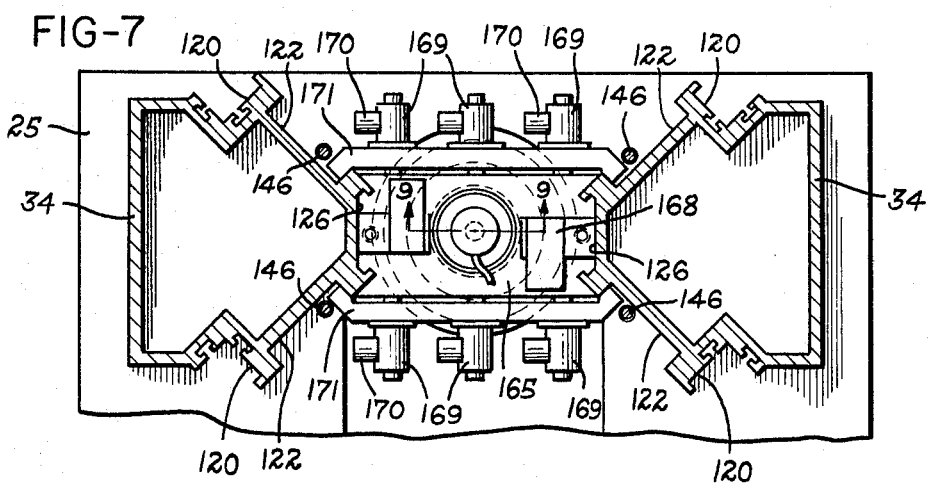

United States Patent Office 3,286,324
Patented Nov. 22, 1966

3,286,324
MACHINE TOOL
Charles F. Hautau, Oxford, Ohio, assignor to The Black Clawson Company, Hamilton, Ohio, a corporation of Ohio
Filed Dec. 21, 1964, Ser. No. 419,979
15 Claims. (Cl. 29—27)

This invention relates to a machine tool, and more particularly, to a high production machine tool adapted to finish cylindrical workpieces of substantial weight and size, as for example, metal rolls used in rolling mills for steel or in machines for the manufacture of paper.

Rolls for applications of these types are usually formed from solid cast or forged steel, and for the larger mills and machines, may weigh 120 tons or more and may exceed 35 feet in length and 6 feet in diameter. In view of such tremendous weight and size, the machining and finishing of these rolls on separate horizontal lathes and grinders presents a number of problems. For example, when the ends of a roll are secured in the head and tail stock of a horizontal lathe or grinder, the magnitude of the weight causes the roll to sag slightly at the center, and thus prevents accurate finishing of the roll within close tolerances. For this reason, supporting rollers are usually spaced under the journals or end portions of the roll to reduce the sagging or axial distortion. While these supporting rollers help, they do not eliminate this distortion, especially with the longer rolls.

Another problem with horizontal metal removing machine tools which are used for finishing these large rolls is the concentration of the roll weight along the bottom portion of the vertically positioned anti-friction support bearings. This repetitive loading and unloading of the bearings frequently produces chatter in the workpiece or roll and, in addition, develops excessive wear in the bearings.

A further problem exists with the positioning of the rolls on horizontal machine tools. It is desirable to mount each end of the roll on the machine tool so that the roll will be positioned on an axis of rotation which provides for optimum metal removement from the roll, and thus the most efficient use of the machine tool. This requires a determination of the location for centering holes on each end of the roll, after which the holes are machined, one end at a time, by reversing the position of the roll in the lathe, usually with the use of an overhead traveling crane. This operation not only results in down time on the lathe, but also ties up the use of the crane.

After a roll is machined on a horizontal lathe, the roll is usually transferred to a separate grinding machine tool where the roll is finished to within final tolerances and desired surface finish. Again, this transfer operation usually requires the use of an overhead crane which prevents the crane from being used on other jobs. In addition, both the lathe and grinder remain idle during the transfer operation. It should be realized that in view of the extremely high cost of these machine tools, every minute of down time contributes to inefficient use of the machine tool. As such, it is highly desirable for economical reasons to operate the machine tools at the highest rate possible.

Accordingly, the present invention is directed to a novel machine tool which substantially reduces the time for finishing a roll of the size and weight mentioned above. In general, this is accomplished by combining the lathe machining operations and the grinding operations into one machine tool including what is herein referred to as a vertical roll finisher which performs multiple operations on the roll while the roll is positioned with a vertical axis. Furthermore, by supporting the roll within the machine tool of the invention with its axis vertical during the machining and grinding operations, the problem of sagging or axial distortion of the roll due to its own weight is avoided, as is the chattering caused by the non-uniform loading of the anti-friction support bearings.

For the most economical and efficient use of the vertical roll finisher and for reducing the need for an overhead crane, the machine tool of the invention incorporates a transfer carriage which receives the unfinished roll in horizontal position and supports the roll for the preliminary machining of the end portions of the roll so that the roll can be received by the vertical roll finisher. This preliminary machining is accomplished, in general, by providing a power tool which can be positioned by a sliding bridge at either end of the horizontally positioned roll.

The machine tool of the invention incorporates a device which operates prior to machining of the roll end portions to sense or gauge the exterior configuration and position of the roll and thereby to indicate where the end centering holes should be located for optimum metal removement. In addition, the invention provides a mechanism for positioning the roll in accordance with the optimum centerline indicated by the sensing mechanism so that the roll can be quickly transferred to a vertical axis in proper alignment for the vertical roll finisher.

For the transfer of the unfinished roll from its originally received horizontal position to a vertical position within the vertical roll finisher, the transfer carriage is pivoted, and the roll is moved into a predetermined aligned position so that top and bottom centering members mounted within the vertical roll finisher may pick up the roll, after which the transfer carriage is released. As a result of this basic overall construction of the machine tool of the invention, not only does high production result, but the machine tool can be used with the minimum of down time. In addition, the machine tool of the invention is adapted for substantially complete automatic control, as for example, to be operated by magnetic tapes, or the like.

Accordingly, it is one primary object of the present invention to provide a novel high production machine tool for finishing the cylindrical surface of a roll of substantial weight and size, wherein axial distortion and chattering of the roll is eliminated so that close tolerances may be obtained.

As another object, the present invention provides a novel machine tool which is adapted to receive a large heavy unfinished roll in a horizontal position for the convenient gauging of the roll in addition to the machining of its end portions, and is adapted to transfer the roll into a vertical position in accurate alignment with the center of a vertical roll finisher so that the cylindrical portion of the roll can be machined and completely finished in an efficient manner by a plurality of tool members without requiring additional transfers of the roll.

Another primary object of the present invention is to provide a machine tool, as outlined above, wherein all of the movable components of the tool are adapted to be controlled remotely by an operator who can simultaneously observe each operation of the machine tool and can also remotely control the transfer of the roll.

Still another object of the present invention is to provide a machine tool as outlined above wherein a bridge is provided for supporting a rotary power tool, and the bridge is slidably mounted for horizontal traversing movement over a horizontally positioned roll whereby the rotary power tool can be employed to machine and form centering holes in both ends of the roll to permit the workpiece to be accurately positioned after it is transferred to the vertical roll finisher.

It is also an object of the present invention to provide a machine tool as outlined above which receives and supports an unfinished roll in a horizontal position and includes a sensing mechanism mounted on a bridge for horizontal traversing movement in an axial direction along the roll to indicate the contour of the roll for determining the centerline for the roll which provides for the optimum removal of metal therefrom.

A further object of the present invention is to provide a machine tool as outlined above wherein the vertical roll finisher includes vertically movable top and bottom centering members which are adapted to extend towards each other to engage the centering holes formed in the ends of the vertically positioned roll and wherein the bottom centering member is adapted to move in a cooperative manner with the top centering member for lowering the workpiece until the bottom end portion is received within a chucking mechanism.

A further object of the present invention is to provide a vertical roll finisher having a plurality of vertical guideways on which a plurality of tool members are slidably mounted to enable compound machining and finishing of the roll, and wherein each of the tool members includes a power operated drive mechanism which enables each of the tool members to be moved separately along its supporting guideway by a remote control of the drive mechanism.

Still another object of the present invention is to provide a vertical roll finisher having a drive mechanism mounted at the bottom thereof, and which drive mechanism is connected to a chucking mechanism having a series of radially spaced power operated members which can be controlled separately for gripping the bottom end portion of the roll supported on the bottom centering member spaced within the chucking mechanism.

As another object, the present invention provides a machine tool as outlined above wherein the support carriage for transferring the roll from a horizontal position to a vertical position includes a series of power operated jacks which are adapted to orient the roll while positioned horizontally so that when the workpiece is transferred to the vertical roll finisher, the centering holes formed in the ends of the roll will align with the top and bottom centering members mounted within the finisher.

It is also an object of this invention to provide a drive mechanism for a vertical roll finisher whereby the roll may be rotated with high torque at lower speeds in the nature of 3 r.p.m. or at higher speeds in the nature of 300 r.p.m. with lesser torque, depending upon the metal removing tool element employed.

Still a further object is to provide a machine tool as outlined above wherein the vertical roll finisher includes at least two vertically extending columns which are clamped together by a slidable frame structure incorporating the top centering member so that the columns are rigidized as a unit structure to enable accurate and precision finishing of the roll.

The present invention also provides a machine tool including a vertical roll finisher wherein the drive mechanism includes a horizontally positioned ring gear having a plurality of hydraulically operated motors spaced therearound so that the central portion is available for the centering member and the total torque is not transferred through a single shaft.

Other objects and advantages of the present invention will be apparent from the following description, the accompanying drawings and the appended claims.

In the drawings:

FIG. 1 is a perspective view of a machine tool assembled and constructed in accordance with the invention;

FIG. 2 is a perspective view of the bridge member of the tool of FIG. 1 which is mounted for traversing horizontal movement over the roll to form a centering hole in each end of the workpiece in addition to machining an eccentric surface on one end for gripping by the vertical finisher;

FIG. 3 is a side elevational view, partly broken away, of the machine tool shown in FIG. 1 and illustrating the relative movement of a loading carriage for transferring the roll from a horizontal position to a vertical position;

FIG. 4 is an elevational view of the vertical roll finisher showing a typical roll mounted therein and several tool members which are slidably mounted for vertical movement independently of each other to provide compound finishing of the roll;

FIG. 5 is a view generally on the line 5—5 of FIG. 3 and showing the power operated clamping members for securing a roll to the transfer carriage and the mechanism for orienting the workpiece to locate it according to a predetermined elevational and lateral position;

FIG. 6 is a view on the line 6—6 of FIG. 4 showing the slidable mounting and spaced relationship of the independently controlled power tools which are employed for compound machining and finishing of the vertically positioned roll;

FIG. 7 is a view on the line 7—7 of FIG. 4 showing the mounting arrangement of the vertically movable clamping frame which carries the top centering member;

FIG. 8 is an enlarged section generally on the line 8—8 of FIG. 3 showing the co-axial drive mechanism for rotating the roll mounted within the vertical roll finisher and the general arrangement of the drive and chucking mechanisms;

FIG. 9 is an enlarged section on the line 9—9 of FIG. 7 showing the top centering member rotatably carried by the top clamping frame;

FIG. 10 is a somewhat schematic axial section view of a typical power driven nut which is used for slidably moving the different components of the machine tool according to the invention; and FIG. 11 is a fragmentary elevational view of the outward side of the traversing bridge member and showing the sensing or gauging mechanism carried by the bridge, which indicates the outer surface contour of the roll when it is first received as a rough casting or forging.

Referring to the drawings, which illustrate a preferred embodiment of the present invention, FIG. 1 shows generally the overall construction and arrangement of the major components of a machine tool according to the invention. A horizontally extending base structure 25 has a generally flat top surface 26 on which is mounted a pair of parallel spaced guide ways 28. A step surface 29 is provided on one end of the base structure 25 and serves to support the vertical roll finisher 30 which includes a frame member defined by a pair of parallel spaced vertical columns 34 connected at the top by a top spanning member 36 from which a rotatable arm 37 is suspended for supporting the operator's observation booth 39 in which the control console is located. The hydraulic motors 40 serve to control the vertical and lateral positioning of the booth 39 by the combined rotation of the arm 37 and the rotation and vertical movement of the booth 39 on the arm.

Spaced centrally within the base structure 25 is a rectangular chamber 41 in which a loading carriage 42 (FIG. 3) is pivotally supported by a base member 44 for rotation on the shaft 45. As shown in FIGS. 3 and 5, the loading carriage 42 is rotated by means of a telescoping pressure cylinder 47 which is pivoted at the bottom to the base member 50 by the shaft 51. The upper end of the pressure cylinder 47 is pivoted to the loading carriage 42 by the shaft 53.

Formed longitudinally along the top surface of the loading carriage 42 is a guideway 55 (FIG. 5) on which is slidably mounted a pair of saddle members 57. Slidably mounted within the traverse guideways 60 (FIG. 3) formed in the saddle members 57 are a pair of generally Y-shaped support members 62 each having a pair of jacks 64 mounted thereon which are spaced in converging relationship to one another and are individually power operated by the hydraulic motors 66. Mounted on the top ends of the jacks 64 are power driven rollers 68 (FIG. 5) which cooperate to rotate the generally cylindrical workpiece or roll 70, when desired for gauging the roll.

As mentioned above, the roll 70 is received by the machine tool of the invention as a rough casting or forging and is positioned with a horizontal axis. Commonly, the end portions of the roll 70 include a series of successively smaller cylindrical portions 71 and 72 which must be machined and finished along with the main cylindrical portion or face 75 to provide the roll 70 with journals for mounting in suitable bearings and for connection to a drive means. For holding the roll 70 firmly against the rollers 68, a pair of clamping arms 76 (FIG. 5) are pivotally mounted on each side of the support members 62 and are hydraulically operated by the pressure cylinders 77.

The lateral movement of each of the Y-shaped support members 62 within the guideways 60 is independently controlled by the operation of the hydraulic motor 81, and the longitudinal movement of each saddle member 57 along the guideway 55 is controlled by operation of the hydraulic motor 83. A typical drive mechanism employed to obtain this independent movement is shown in FIG. 10, where a hydraulic motor drives the worm gear 85 which, in turn, rotates the nut 86 about the stationary screw 87 which preferably is mounted in tension to eliminate any back play. The nut 86 is rotatably supported within the housing 88 and is prevented from shifting axially by the thrust retaining rings 89.

As a result of this control and supporting arrangement for the roll 70, it can be seen that the jacks 64 can be moved independently along their own axes in addition to lateral movement along the guideway 60. Thus, the roll 70 can be oriented or positioned until the roll centerline which provides the most uniform removal of metal is spaced at a predetermined elevational and lateral position.

Slidably mounted on the guideways 28 extending along the top surface 26 of the base structure 25 is a support bridge 90 including parallel spaced downwardly depending columns 92 having formed in the bottom thereof guideways 94 complementary in cross-section to the guideways 28. The central portion 96 of the bridge 90 connects the two vertical columns 92 and slidably supports a rotary power tool member 98 by means of the carriage member 99. Included as part of the tool member 98 is a turret head 100 which includes a rotatably mounted boring or centering tool element 101 (FIG. 5) and a milling tool element 102, both of which are operated by the hydraulic motor 103.

The vertical sliding movement of the tool member 98 on the carriage member 99 is controlled by operation of the hydraulic motor 104, and the lateral movement of the carriage member 99 within the guideway 105 is controlled by rotation of the screw 106 driven by the hydraulic motor 107. The sliding movement of the bridge 90 along the guideways 28 is controlled by operation of the hydraulic motor 109 which is connected by the shaft 110 to the gear boxes 111 from which shafts (not shown) extend through the columns 92 to drive nuts along the screws 112 by mechanisms similar to that shown in FIG. 10. By this mounting and control arrangement, it can be seen that the bridge 90 can be positioned at each end of the roll 70 so that the boring tool 101 can form conical shaped centering holes 115 (FIG. 1) in each end of the roll 70, and the milling tool element 102 can be used to form flats 116 (FIG. 8) or other eccentric surfaces on the end portion 72 of the roll 70 for positive gripping of the roll 70 in the vertical roll finisher 30.

As mentioned above, the vertical roll finisher 30 includes two support columns 34 which are generally triangular in cross-section (FIG. 6 and 7) and include vertically extending guideways 120, 122 and 126. As shown in FIGS. 4 and 6, the guideways 122 serve to support slidably a series of metal removing tool members 127 and one or more power operated grinding tool members 130. Each of the tool members 127 carries a tool element 132 which can be adjusted radially in relation to the vertical centerline of the roll 70 by operation of the corresponding hydraulic motor 135 (FIG. 4). The grinding tool member 130 includes a grinding wheel 138 which is power driven by the motor 139 (FIG. 1) and is carried by the arm 140 pivotally mounted on the shaft 142 (FIG. 6). The pivoting movement of the arm 140 can be remotely controlled by operation of the hydraulic motor 144.

For the purpose of moving each of the tool members 127 and 130 in a vertical direction along the guideways 120 and 122, each tool member is provided with a power driven nut mechanism, similar to that shown in FIG. 10, which is rotated by the hydraulic motor 145 (FIG. 4) about a stationary screw 146 extending vertically within a guideway 122. In this manner, each of the tool members 127 and 130 may be independently fed in a vertical direction in a cooperative manner to provide for compound machining and finishing of the exterior surface of the roll 70.

When the roll 70 is transferred from its horizontal position to the vertical roll finisher 30, by means of the carriage 42 (FIG. 3), a bottom centering member 150 (FIG. 8) is extended vertically so that the conical shaped end portion 151 of the centering member engages the centering hole 115 formed within the bottom end of the roll 70. Subsequently, an upper centering member 160 (FIG. 3) is lowered to engage the top centering hole 115 formed in the top end of the roll 70. As shown in FIGS. 4 and 7, the top centering member 160 is carried by a clamping frame 165 which slides vertically within the center guideways 126 and is adapted to be moved by a power operated nut mechanism, similar to that shown in FIG. 10, driven by the hydraulic motor 168 (FIG. 4). In addition, another series of rotary nut mechanisms 169 (FIG. 7) driven by the hydraulic motors 170 are employed to draw the rails 171 against the frame 165 and thereby to clamp the columns 34 tightly against the ends of the frame 165. This serves to rigidize the vertical roll finisher 30 and provides for extreme accuracy in finishing.

Once the bottom centering member 150 and the top centering member 160 have engaged the holes 115 in the ends of the roll 70, the clamping arms 76, which are employed to secure the roll 70 to the loading carriage 42 during the transfer operation, are released, and the loading carriage is returned to its horizontal position as shown in FIG. 3. To prevent the weight of the roll 70 from shifting axially on the loading carriage 42 during the transferring movement, however, a support member 178 is mounted on the carriage guideway 55 and is adapted to be rigidly positioned against a shoulder formed on the roll 70 to support the weight of the roll when it is moved to its vertical position. Preferably, the upper end of the support member 178 is provided with a yoke which is adapted to engage at least half of the shoulder formed on the roll 70. When the roll is in its vertical position, the centering member 150 extends to engage the bottom centering hole 115 formed within the roll 70, and in cooperation with the top centering member 160, moves the workpiece upwards slightly so that the carriage 142 can be pivoted backward to its horizontal position.

Referring to the detailed view of the drive and chucking mechanisms shown in FIG. 8, the bottom centering member 150, as mentioned above, is cylindrical in configuration and includes a conical shaped upper portion 151 which is adapted to seat within the centering opening 115 formed in the bottom end of the roll 70. Surrounding the square portion 202 formed on the centering member 150, and supported by the shoulder 204 and the resilient pad 205, is an annular drive ring 206 having a series of vertically extending pins 208 mounted therein. The pins 208 are so spaced in relation to the pointed tip of the centering member 150 that the pointed ends of the pins are forced into the bottom face of the roll 70 as the centering member 150 is moved upwardly in response to hydraulic pressure within the chamber 212 formed within the supporting bowl member 215.

As schematically shown in FIG. 8, the centering member 150 is adapted to rotate with the bowl 215 which is rotatably supported by the bearings 216 within an annular carriage 220. A positive drive connection is provided by the sliding engagement between the hexagonal shaped post 221 rigidly mounted in the bottom portion of the bowl member 215 and a correspondingly shaped opening formed within the centering member 150. Thus when it is desirable to rotate the roll 70 at relatively high speeds, on the order of 300 r.p.m., the bowl 215 is driven by the high speed hydraulic motor 222 which is connected by the shaft 223.

Spaced between the motor 222 and the bowl member 215 is a rotary gland or union 225 through which hydraulic fluid is supplied to the chamber 212 through the fluid pressure line 226. It has been determined that when it is necessary to rotate the roll 70 at higher r.p.m.'s for machining by metal removing tool elements formed from a material such as ceramic, a substantially lower torque is required, and thus a single high speed motor 222 is sufficient to rotate the roll. Furthermore, the positive engagement between the pins 208 and the bottom face of the roll 70 is sufficient to transfer the lower torque required for high speed rotation.

On the other hand, when it is necessary to rotate the roll 70 at lower speed, as for example 3 r.p.m., with substantially higher torque, another drive system is employed.

To provide this torque, the carriage 220 is rotatably mounted on the hollow base structure 230 by the bearings 231. The carriage 220 includes an annular internal ring gear 235 which is spaced outwardly from the hub portion 237 to provide sufficient space for the mounting of a series of low speed hydraulic motors 240, each of which independently drives the carriage 220 through a drive pinion 242 in mesh with the ring gear 235. For example, ten low speed hydraulic motors 240 may be employed and arranged uniformly around the hub portion 237. As a further example, each motor 240 may develop 100 horsepower which, in turn, provides a combined power supply of 1,000 horsepower.

By the arrangement of the low speed motors 240 in this manner, it can be seen that the combined torque produced by the motors is not transferred through a single drive shaft to the roll 70. Instead, the combined torque is transferred to the roll 70 through a series of radially positioned chuck members 245 which are slidably mounted in the guideways 247 formed within the top portion of the carriage 220. The chuck members 245 are operated by corresponding hydraulic motors 250 which are mounted on the carriage 225. Each motor 250 is adapted to drive a feed screw 254 connected to its corresponding chuck member 245. The radially inward face 256 or each of the chuck members 245 is adapted to engage the corresponding flat 116 formed on the end portion 72 of the roll 70.

Preferably, each of the hydraulic motors 250 is independently controlled whereby each of the chuck members 245 can be brought into engagement separately with a corresponding flat 116. Thus it is to be understood that it is not mandatory that the flats 116 formed on the portion 72 be equally spaced from the rotational axis of the roll 70. However, to prevent radial shifting of the roll 70 on the centering member 150 as the chuck members are brought into engagement, it is preferred that strain gauges be employed on the surface 256 of each of the chuck members 245 to indicate when each chuck member comes into contact with a flat 116 so that corresponding motor 250 can be stopped.

Referring to FIG. 9, which shows the mounting of the top centering member 160, the member is cylindrical in configuration and is slidably mounted within a pressure cylinder 270. To enable the centering member 160 to rotate with the roll 70, the pressure cylinder 270 is rotatably supported within the clamping frame 165 by the roller bearings indicated schematically at 272. In a manner similar to the mounting of the bottom centering member 150, the top centering member 160 is prevented from rotating in relation to the pressure cylinder 270 by the sliding engagement between the hexagonal shaped post 275 rigidly mounted within the cylinder 270 and extending into a correspondingly shaped opening formed within the top centering member 160.

Fluid pressure is introduced through the rotary union 278 from the pressure lines 280 which are connected through the passageways 282 and 284 to the opposite faces of the piston 285 formed on the top end of the centering member 160. Thus by controlling the fluid pressure within the passageways 282 and 284, the top centering member can be moved vertically in relation to the frame 165. After the roll 70 has been transferred into a vertical position within the vertical roll finisher 30, the clamping frame 165 is lowered by operation of the hydraulic motor 168 until the top centering member 160 is adjacent the centering hole 115 formed within the top end of the roll 70. At this point the rails 171 are drawn towards the frame 165 by the motors 170 and thereby clamp the columns 134 tightly against the frame 165. Fluid pressure is then introduced into the cylinder 270 through the passageway 282. This causes the top centering member 160 to move downwardly until it firmly engages the centering hole 115 in the roll 70.

When it is desirable to lower the roll 70 downwardly for engagement of the jaws 245 to provide high torque at a low r.p.m., the upper clamping frame 165 is lowered along with the bottom centering member 150 until the bottom end portion 72 is spaced within the jaws 245. The frame 165 is then clamped against the column 34 as described above, and the jaws 245 are closed.

Referring to FIGS. 3 and 11, it has been found desirable to utilize the bridge 90 for gauging the exterior surface contour of the roll 70 when it is first received as a rough casting or forging. This is desirable to determine the precise location of the rotational centerline of the roll which provides the most uniform removement of metal. Frequently, the rough rolls are received having somewhat distorted configuration, as for example, a generally flat portion or a somewhat elliptical cross-sectional configuration. To employ the bridge 90 for this gauging purpose, a screw 290 driven by a hydraulic motor 291 is provided along the back side of the cross member 96, and a pivotable top arm 292 and a pair of side arms 294 are adjustably carried by nut members mounted on the screw 290. The arms 292 and 294 are each provided with a sensing roller 296, which is attached directly on the end of the arm 292 and connected by levers 297 to the arms 294.

As the bridge 90 is moved horizontally along the guideways 28, the rollers 296 follow the surface contour of the roll 70 and through a suitable electrical indicating device 299 will generate the longitudinal exterior configuration of the roll 70 on a chart which is installed in the control console located within the booth 239. In this manner, the operator of the machine tool can determine the precise configuration of the roll 70 and accordingly position it by operation of the jacks 64 and lateral movement of the saddles 57.

Thus when the carriage 42 is pivoted to transfer the roll 70 to the vertical roll finisher 30, the top and bottom centering holes 115 will be in perfect alignment with their corresponding centering members 160 and 150. While it is preferred to position the roll 70 at a predetermined elevation and lateral position while the roll is positioned horizontally so that the holes 115 are aligned with the centering members 150 and 160 after the roll is transferred to a vertical position, it can be seen that the roll could be positioned after it is transferred by use of the jacks 64 and movable saddle 57. It has been found, however, that less time is required for transferring the roll if it is precisely positioned while it is in a horizontal attitude.

From the drawings and the above description, it can be seen that the machine tool of the present invention has a number of advantages and features. Basically, the machine is adapted to receive a roll of substantial size and weight and to machine and finish the roll according to predetermined dimensions, tolerances and surface finish without requiring the use of an overhead crane after the roll has once been loaded on the carriage. Thus the machine tool of the invention is adapted to receive a rough casting or forging and can then completely finish the roll including the machining and grinding operations. Furthermore, it can be seen that each operation of the tool may be controlled remotely by an operator stationed within the booth which is adapted to be adjusted for allowing the operator to observe each operation of the machine tool.

It has been determined that the time required for completely finishing a roll of the size and weight referred to above on the machine of the present invention is substantially less than the time required for machining and finishing the roll on machine tools as presently used. In general, the machine tool of the invention accomplishes this substantial time savings by combining all of the finishing operations including a grinding operation in the vertical roll finisher. In addition, the roll finisher employs a plurality of tool members which are independently controllable so that each of the tool members can be employed simultaneously for the compound finishing of the roll. It is this continuous and complete compound finishing which substantially reduces the time previously required for finishing a roll.

The positioning of the roll on a vertical axis within the roll finisher not only eliminates the problem of sagging of the roll but also enables the weight of the roll to be uniformly distributed about the anti-friction bearing 231. As a result, there is no repetitive loading and unloading of the bearings as exists when a roll is rotated on a horizontal lathe or grinder. A further important feature provided by the machine tool of the invention is the coaxial drive mechanism which provides for high speed rotation of the roll when it is desirable for particular tool elements or for low speed rotation at substantially higher torque when it is desirable for other types of tool elements.

By arranging the series of low speed hydraulic motors around the ring gear 235 (FIG. 8), several advantages result. For example, the motors 240 operate in a cooperative manner to rotate the carriage 220 without requiring that the combined torque produced by all of the motors be transferred through a single shaft or a single set of engaging gears. Thus the enormous torque produced by the low speed hydraulic motors is uniformly distributed around the rotating carriage 225 which, in turn, uniformly transfers the torque to the roll 70. Furthermore, by arranging the low speed motors 240 in a ring, the central portion of the drive mechanism is available for mounting the high speed hydraulic motor 222 and for slidably mounting the bottom centering member 150. In addition, by employing a series of low speed hydraulic motors, it can be seen that one of the motors can be removed for servicing without requiring a shutdown of the vertical roll finisher, This feature is significant since it is highly desirable to have full time operation of the machine tool in view of the enormous capital investment required.

Another important feature of the machine tool according to the invention is the traveling bridge 90 which carries the power tool 98. As mentioned above, this rotary power tool can be quickly moved to each end of the roll for machining the end portions of the roll. Furthermore, the milling tool element 102 can be employed not only for forming the flats 116, but for removing the excess end portion of the roll which was gripped within the chuck mechanism, after the roll is completely finished and returned by the carriage 42 back to its horizontal position, as shown in FIG. 1. Also, the bridge 90 can be employed for carrying the indicating mechanism shown in FIG. 11 which substantially reduces the time for determining the surface contour of a roll in the form of a rough casting or forging.

By providing the transfer carriage 42 with the supporting jacks 64, it can be seen that the jacks can be independently adjusted for engaging the roll after it has been finished within the vertical roll finisher 30. This is necessary since the finished roll will of course be smaller in diameter than the roll in its rough form as it was originally transferred to the vertical roll finisher. Furthermore, it becomes apparent that in view of the generally symmetrical construction of the vertical roll finisher, another set of guideways 28 and another carriage 42 could be spaced on the opposite side of the finisher for receiving the finished roll. This would permit the use of the bridge 90 for preparing a second roll while the first roll was being finished by the vertical roll finisher.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. A machine tool for completely finishing a metal roll of substantial weight and size, comprising a vertically extending frame member adapted to receive the roll positioned with its axis vertical, a power operated drive mechanism mounted at the bottom of said frame member and including chuck means adapted to grip a lower end portion of the roll and to rotate the roll about its vertical axis, a bottom centering member mounted within said chuck means, means for providing engagement between said bottom centering member and a centering hole in the end of the roll, a top centering member mounted on said frame member, means for moving said top centering member in a vertical direction along said frame member to adjust the vertical spacing between said top centering member and said bottom centering member for accommodating rolls of different lengths, a vertical guideway connected to said frame member, a tool member slidably mounted on said guideway, and means for moving said tool member along said guideway for finishing the circumferential surface of the roll while the roll is rotated by said drive mechanism.

2. A machine tool as defined in claim 1 wherein power operated means are connected to said bottom centering member for extending said member in a vertical direction for engagement with the centering hole in the bottom end of the roll and for lowering the bottom end portion of the roll down into said chuck means.

3. A machine tool as defined in claim 1 wherein a plurality of vertical guideways are connected to said frame member, a plurality of tool members are slidably mounted on said guideways, and power operated means are associated with each of said tool members for independently moving said members along said guideways.

4. A machine tool as defined in claim 1 wherein said chuck means includes a series of radially spaced gripping members each of which is independently power operated for radial movement to engage the exterior surface on the lower end portion of the roll.

5. A machine tool for completely finishing a metal roll of substantial weight and size within minimum axial distortion of the roll, comprising a vertically extending frame member adapted to receive the roll positioned with its axis vertical, a power operated drive mechanism mounted at the bottom of said frame member and including chuck means adapted to grip a lower end portion of the roll and for rotating the roll about its vertical axis, a bottom centering member mounted within said chuck means, power operated means connected to said bottom centering member for extending said member in a vertical direction for engagement with a centering hole in the bottom end of the roll and for lowering the bottom end portion of the roll down into said chuck means, a top centering member mounted on said frame member, means for moving said top centering member in a vertical direction along said frame member to adjust the vertical spacing between said top centering member and said bottom centering member for accommodating rolls of different lengths, a plurality of vertically extending guideways connected to said frame member, a plurality of tool members slidably mounted on said guideways, and power operated means for moving said tool members independently along said guideways for compound finishing of the circumferential surface of the roll while the roll is rotated by said drive mechanism.

6. A machine tool as defined in claim 5 wherein said chuck means includes a series of radially spaced gripping members each of which is power operated for independent radial movement to engage the exterior surface of the lower end portion of the roll after it has been lowered into said chuck means by said bottom centering member.

7. A machine tool for completely finishing a metal roll of substantial weight and size with minimum axial distortion of the roll, comprising a loading carriage having means for receiving the roll in a horizontal position, means for movably positioning the roll on said carriage, means for pivotally mounting said carriage, a vertically extending frame member adapted to receive the roll positioned with its axis vertical, power operated means for pivoting said carriage to transfer the roll from a horizontal position to a vertical position in spaced relationship with said frame member, a power operated drive mechanism mounted at the bottom of said frame member and including chuck means adapted to grip a lower end portion of the roll and for rotating the roll about its vertical axis, a top centering member mounted on said frame member, means for moving said top centering member in a vertical direction along said frame member for engagement with a centering hole in the top end of the roll, a vertically extending guideway connected to said frame member, a tool member slidably mounted on said guideway, and means for moving said tool member along said guideway for finishing the circumferential surface of the roll while the roll is rotated by said drive mechanism.

8. A machine tool as defined in claim 7 wherein said loading carriage includes horizontally extending guideway means connected thereto, at least two support members slidably mounted on said guideway means for receiving rolls of different lengths, and power operated means for movably positioning the roll on said carriage.

9. A machine tool as defined in claim 7 comprising a bottom centering member mounted within said chuck means, and power operated means connected to said bottom centering member for extending said member in a vertical direction for engagement with a centering hole in the bottom end of the roll and for lowering the bottom end portion of the roll down into said chuck means.

10. A machine tool as defined in claim 9 wherein said chuck means includes a series of radially spaced gripping members each of which is power operated for independent radial movement to engage the exterior surface on the lower end portion of the roll.

11. A machine tool for completely finishing a metal roll of substantial weight and size, comprising a loading carriage having means for receiving the roll in a horizontal position, means for movably positioning the roll on said carriage, a movable overhead frame structure supporting a rotary power tool, guideway means for positioning said frame structure and said power tool at each end of the roll to machine the ends thereof, means for pivotally mounting said carriage, a vertically extending frame member adapted to receive the roll positioned with its axis vertical, power operated means for pivoting said carriage to transfer the roll from a horizontal position to a vertical position in spaced relationship with said frame member, a power operated drive mechanism mounted at the bottom of said frame member and including chuck means adapted to grip a lower end portion of the roll and for rotating the roll about its vertical axis, a top centering member mounted on said frame member, means for moving said top centering member in a vertical direction along said frame member for engagement with a centering hole in the top end of the roll, a vertically extending guideway connected to said frame member, a tool member slidably mounted on said guideway, and means for moving said tool member along said guideway for finishing the circumferential surface of the roll while the roll is rotated by said drive mechanism.

12. A machine tool as defined in claim 11 wherein said overhead frame structure has the general configuration of a bridge having downwardly depending portions slidably supported on guideways spaced on opposite sides of said carriage to provide for horizontal movement of said frame structure over the roll supported by said carriage, and comprising means for movably mounting said rotary power tool on said overhead frame structure to enable said power tool to be positioned in relation to the position of the roll for forming centering holes in the ends of the roll.

13. A machine tool for completely finishing a metal roll of substantial weight and size, comprising a vertically extending frame member adapted to receive the roll positioned with its axis vertical, a power operated drive mechanism mounted at the bottom of said frame member and including chuck means adapted to grip a lower end portion of the roll and for rotating the roll about its vertical axis, said drive mechanism including a rotatable central member driven by one motor means for high speed rotation of the roll and a coaxial rotatable annular member driven by second motor means for low speed rotation of the roll at substantially higher torque, a bottom centering member mounted within said chuck means, means for providing engagement between said bottom centering member and a centering hole in the end of the roll, a top centering member mounted on said frame member, means for moving said top centering member in a vertical direction along said frame member to adjust the vertical spacing between said top centering member and said bottom centering member for accommodating rolls of different lengths, a vertical guideway connected to said frame member, a tool member slidably mounted on said guideway, and means for moving said tool member along said guideway for finishing the circumferential surface of the roll while the roll is rotated by said drive mechanism.

14. A machine tool for completely finishing a metal roll of substantial weight and size, comprising a vertically extending frame member adapted to receive the roll positioned with its axis vertical, a drive mechanism mounted at the bottom of said frame member and including chuck means adapted to grip a lower end portion of the roll and for rotating the roll about its vertical axis, said drive mechanism including an annular gear member driven cooperatively by a plurality of motors spaced uniformly around the periphery of said gear for producing substantially high torque on said gear member, a bottom centering member mounted within said chuck means, means for providing engagement between said bottom centering member and a centering hole in the end of the roll, a top centering member mounted on said frame member, means for moving said top centering member in a vertical direction along said frame member to adjust the vertical spacing between said top centering member and said bottom centering member for accommodating rolls of different lengths, a vertical guideway connected to said frame member, a tool member slidably mounted on said guideway, and means for moving said tool member along said guideway for finishing the circumferential surface of the roll while the roll is rotated by said drive mechanism.

15. A machine tool for completely finishing a metal roll of substantial weight and size, comprising vertically extending columns adapted to receive therebetween the roll positioned with its axis vertical, a power operated drive mechanism mounted at the bottom of said column and including chuck means adapted to grip a lower end portion of the roll and for rotating the roll about its vertical axis, a bottom centering member mounted within said chuck means, means for providing engagement between said bottom centering member and a centering hole in the end of the roll prior to the gripping of said chuck means, bridge means connecting said columns, a top centering member carried by said bridge means, vertical guideway means for slidably mounting said bridge means to move said top centering member in a vertical direction to adjust the vertical spacing between said top centering member and said bottom centering member for accommodating rolls of different lengths, power operated clamping means mounted on said bridge means for drawing said columns tightly against said bridge means to provide a rigid frame structure, a vertical guideway connected to said frame structure, a tool member slidably mounted on said guideway, and power operated means for moving said tool member along said guideway for finishing the circumferential surface of the roll while the roll is rotated by said drive mechanism.

No references cited.

RICHARD H. EANES, JR., *Primary Examiner.*